June 7, 1966  W. A. RAY  3,254,660
CLOSURE OPERATOR FOR VALVES
Original Filed Feb. 27, 1959  3 Sheets-Sheet 2
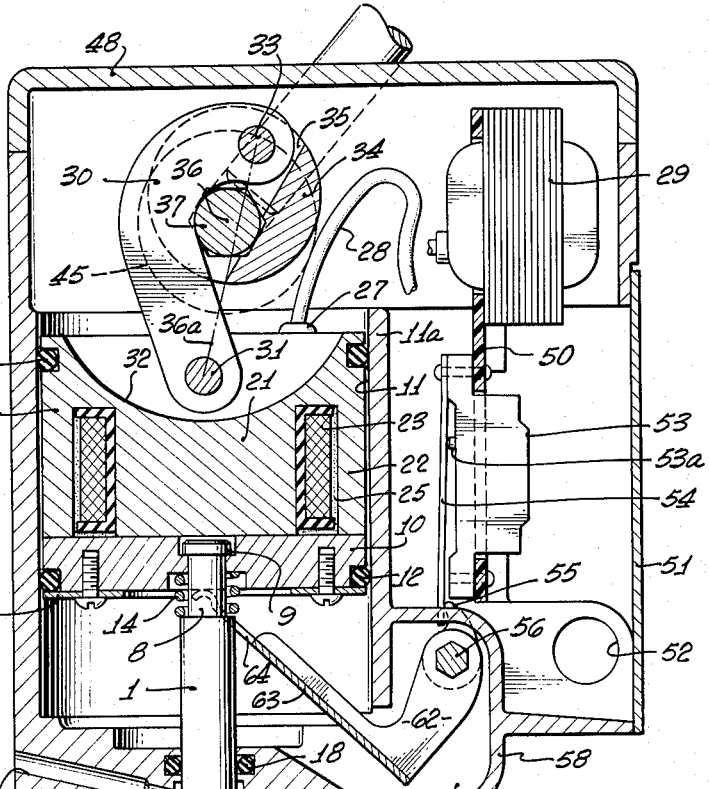
INVENTOR.
WILLIAM A. RAY
BY
Flam and Flam
ATTORNEYS.

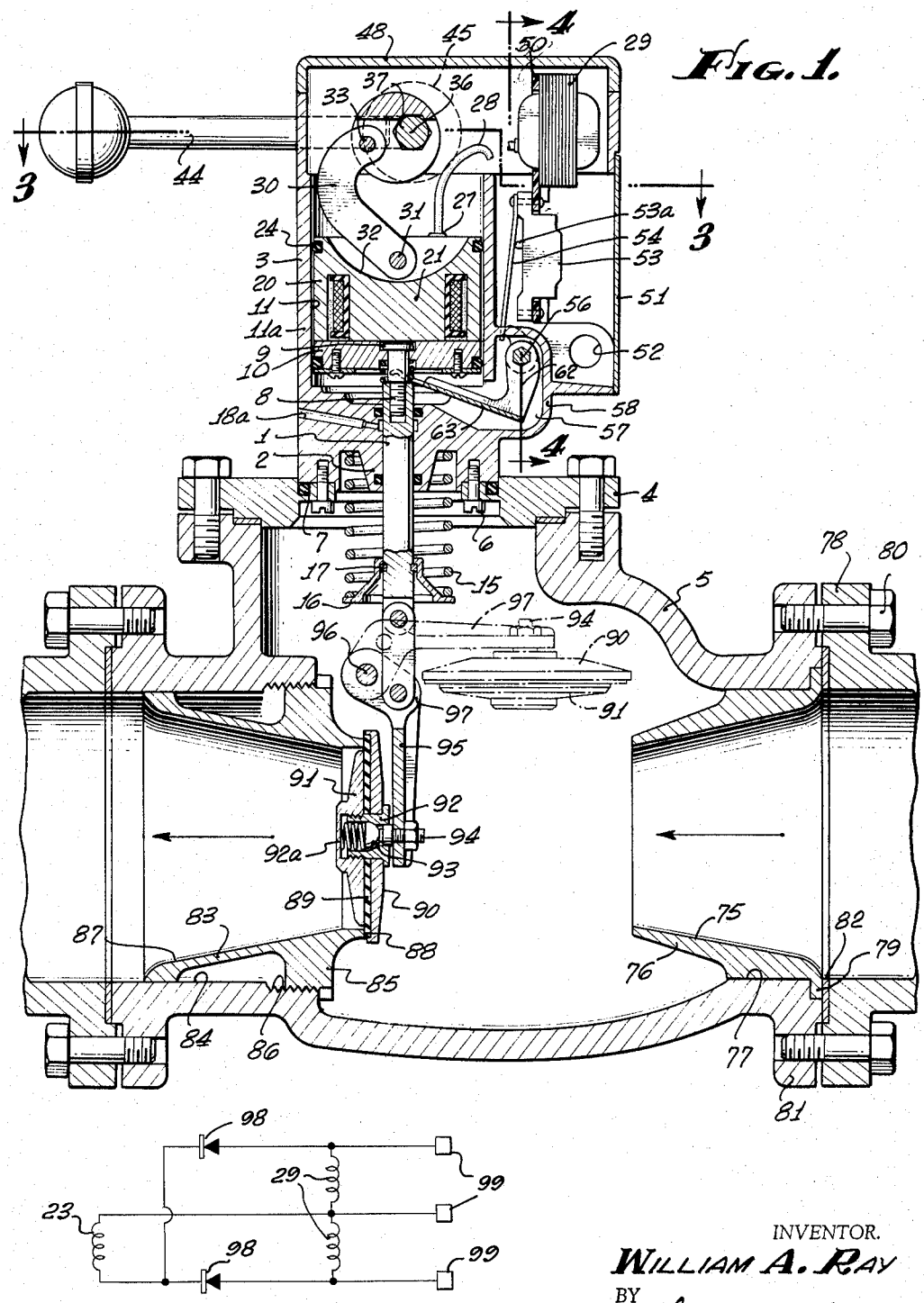

June 7, 1966 W. A. RAY 3,254,660
CLOSURE OPERATOR FOR VALVES
Original Filed Feb. 27, 1959 3 Sheets-Sheet 3
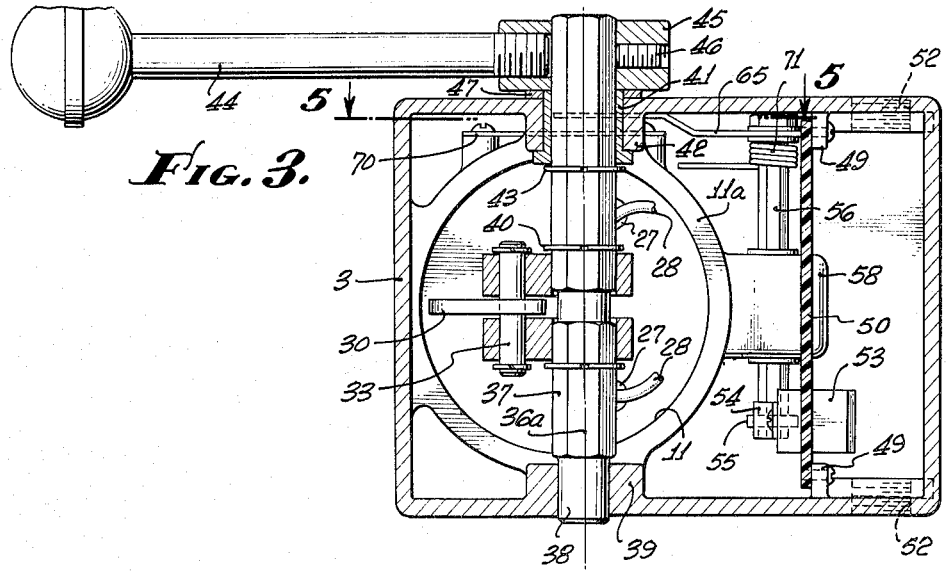
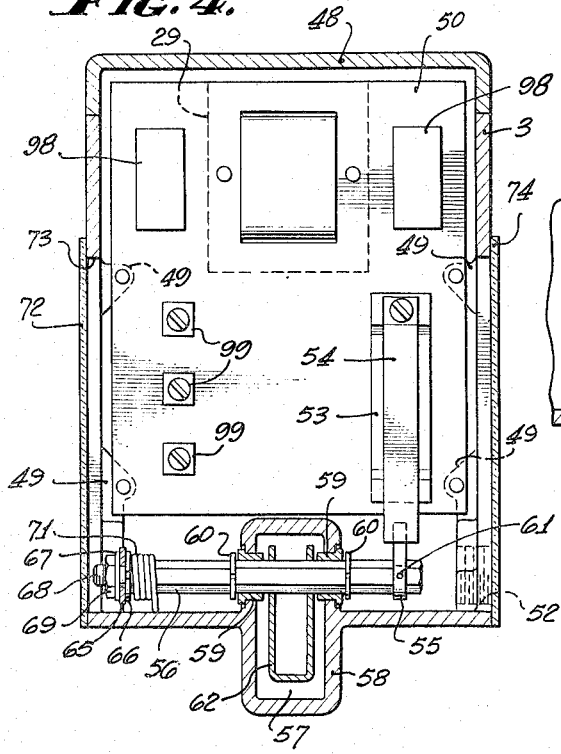
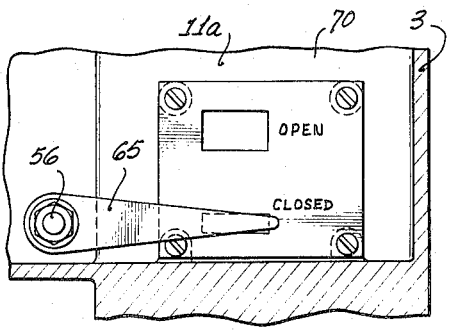
INVENTOR.
WILLIAM A. RAY
BY
Flam and Flam
ATTORNEYS.

United States Patent Office 3,254,660
Patented June 7, 1966

3,254,660
CLOSURE OPERATOR FOR VALVES
William A. Ray, North Hollywood, Calif., assignor to International Telephone and Telegraph Corporation, a corporation of Maryland
Continuation of application Ser. No. 796,168, Feb. 27, 1959. This application Dec. 19, 1963, Ser. No. 333,262
6 Claims. (Cl. 137—66)

This application is a continuation of my prior application Ser. No. 796,168, filed February 27, 1959, entitled Closure Operator for Valves, and since abandoned.

This invention relates to a manual operator for a valve closure or the like.

In some types of valve installations, the operator is connected to the closure through an electromagnet, whereby to open the valve, the electromagnet must be energized; and after the valve is opened, it is urged to closed position should the current for the electromagnet fail. This constitutes a safety precaution, since the valve can be opened or maintained open, only while a predetermined condition exists, which is manifest by the supply of energizing current to the electromagnet.

It is one of the objects of this invention to improve and simplify such valve operators.

It is another object of this invention to provide a compact structure of this character, in which the electromagnet structure is maintained adequately isolated from the valve structure. This is accomplished by the aid of a wall separating the electromagnet from the valve parts, except for the valve closure stem which extends through the wall. In this way, the movement of the stem between open and closed position can be used to operate auxiliary switches enclosed in the same casing as the electromagnet.

It is still another object of this invention to make it possible positively to maintain the valve in the open position without any auxiliary catches or detents, and yet in such manner that the device may be manually moved as desired to closed position.

It is still another object of this invention to make it possible to support the coil of the electromagnet in proper position on the core, in a simple and effective manner.

It is still another object of this invention to make it possible to operate a valve from closed to open position, in which the rate of fluid delivery is quite high.

It is still another object of this invention to conserve the power required to hold electromagnetically the valve closure in operative relation to the manual operator.

In order to open the valve, a manually operated lever is coupled to the electromagnet to move it; and if it be assumed that the electromagnet is energized, then the armature is also moved. A valve closure mechanically connected to the armature is also correspondingly moved to open position.

It is another object of this invention to ensure that the cooperating polar surfaces of the armature and the electromagnet are kept free of dust, dirt, or other foreign matter.

The closure connected to the armature is urged to closed position by a spring. Accordingly, when the electromagnet is deenergized, and unless special precautions are exercised, the motion of the closure is quite rapid. In some valves, the closure is mounted on an arm which swings the closure to closed position. There being substantial mass in motion, the closure disc can be quite severely damaged. It is therefore still another object of this invention to damp this motion, as by a dashpot effect, conveniently obtained by the use of the cylindrical guide that encompasses the electromagnet and the armature.

It is still another object of this invention to provide a compact and efficient electromagnetically operated valve structure of the swing type.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a vertical sectional view of an operator incorporating the invention, shown in association with a valve, the valve being shown in closed position, the open position being indicated by phantom lines;

FIG. 2 is an enlarged vertical section of the operator, said operator being in valve opening position;

FIG. 3 is a sectional view, taken along a plane corresponding to line 3—3 of FIG. 1;

FIG. 4 is a sectional view taken along a plane corresponding to line 4—4 of FIG. 1;

FIG. 5 is a sectional view taken along a plane corresponding to line 5—5 of FIG. 3;

FIG. 6 is a detail sectional view, illustrating the manner in which the coil for the electromagnet utilized with the invention is supported on the electromagnet core; and FIG. 7 is a wiring diagram of the circuit for the electromagnet coil.

In FIGS. 1 and 2 an actuator or stem 1 is indicated, adapted to be moved axially, as for operating a valve structure. The specific details of the valve structure will be described hereinafter.

The stem 1 is guided in a boss 2 formed in the bottom wall of a frame member or casing 3. The lower portion of the frame member 3 is substantially cylindrical. It is sealingly joined to a cover or bonnet 4 that cooperates to cover the upper opening of a valve body 5 (FIG. 1). For example, screws 6 may be provided for holding the frame member or casing 3 to the cover 4. An O-ring 7 may be interposed in a groove formed in the upper surface of the cover member to provide an adequate fluid seal. In this way, escape of fluid to the operator mechanism is prevented.

The upper end of the stem 1 has a threaded aperture into which extends the reduced threaded end of a post 8. This post 8 carries an enlarged head 9, by the aid of which the stem 1 may be connected to the disc-like armature 10, made of magnetic material. This armature 10 operates in a cylindrical wall 11a having an internal cylindrical surface 11. This surface has an axis corresponding to the axis of the stem 1. The wall 11a is formed integrally with the frame or casing 3 (FIG. 3).

In order to provide a seal between the piston structure and the surface 11, use is made of a Teflon O-ring 12 held in place around a reduced portion of the armature 10. By the aid of such a seal, the polar surfaces of the electromagnet hereinafter described, are kept free of foreign matter, such as dust or the like. Ring 12 is held in place by an overlying annular plate 13 attached to the surface of the armature 10. There is substantial clearance between armature 10 and the guiding surface 11, so that there is no danger of binding. The Teflon ring 12 can operate for a long period without any lubrication.

The post 8 passes through a clearance aperture formed in the central portion of the armature 10 which has a reduced thickness. A compression spring 14 surrounds the post 8 and is confined between the upper surface of the stem 1 and the lower surface of the armature 10. In this way, some relative freedom of movement may be imparted to the armature 10 with respect to the stem 1 so that it may seat properly on an electromagnet core hereinafter described.

The stem 1 is furthermore urged downwardly by the aid of a strong compression spring 15 surrounding the stem 1. The upper end of the spring 15 abuts the lower surface of the casing or frame 3. This lower end abuts the flange of a spring retainer 16 having limited downward movement by aid of a spring ring abutment 17 mounted on the stem 1.

Furthermore, O-rings 18 and 19 are located in grooves in the boss 2, serving to seal around the stem 1. A vent 18a between the rings 18 and 19 ensures escape of any fluid which may pass the lower ring 19.

Also slidable and guided in the cylindrical surface 11 is a cylindrical electromagnet core 20, having a central pole 21 and an annular pole 22. Disposed around the central pole of the electromagnet is a coil structure 23, including the flanged coil frame 23a (FIG. 6). At the upper end of the core 20 there is provided an annular groove for the accommodation of a rubber O-ring 24. This ring thus cooperates with Teflon ring 12 on armature 10 to seal off the surfaces of the armature 10 and core 20. There is thus no danger of trapping foreign matter between these surfaces, and of preventing substantially perfect contact between these surfaces.

When the electromagnet coil 23 is energized, the armature 10 can be moved upwardly in response to the upward movement of the core 20, and the stem 1 assumes one of its two operative positions. Should the electromagnet coil 23 be deenergized for any reason, the armature 10 will be urged downwardly by the spring 15 so that the stem 1 will assume the second of its operating positions. In the position shown in FIG. 1, the stem 1 serves to maintain a valve closure in closing position as will be hereinafter described.

Further to reduce the likelihood of corrosion, the exterior surfaces of the core member 20 may be chrominum-plated, and the same treatment is given to the armature 10. Furthermore, the coil 23 may be held in place on the core 20 by aid of an epoxy-type thermosetting resin indicated by reference character 25. Further to assist in holding the coil 23 in place, a pair of keying sleeves 26 (FIG. 6) are molded integrally with the coil frame 23a, and are received in appropriate apertures in core 20. The upper ends of the sleeves may be "riveted" by appropriate application of heat and pressure to form the enlarged heads 27 (see also FIG. 3). The frame 23a is purposely made from an appropriate plastic material, such as nylon, so as to make it possible to form these heads after the coil structure 23 is mounted in core 20. Through the sleeves 26 may pass the insulated leads 28 for coil 23, extending to a source of direct current. For this purpose, a transformer 29 and rectifiers 98 (FIG. 4) are provided. The manner in which this transformer and the rectifiers are supported will be described hereinafter. The transformer 29 may have a center tap, and the end terminals may be connected to one terminal of coil 23, the other terminal of the coil being connected to alternate paths to the end terminals of the transformer. Each alternate path may include a rectifier 98, as shown in the diagram, FIG. 7.

In the present instance, the electromagnet core 20 is arranged to be manually moved for causing upward motion of stem 1. In this way, the stem can function to operate the valve, but only if coil 23 be energized. The manual movement may proceed to a position sufficient to maintain it in the open position. As before stated, in the event of deenergization of the coil 23 for any reason, the stem 1 is urged downwardly to close the valve by the spring 15. Alternatively, the manual operator can be manually moved to return the stem to the position of FIG. 1.

In FIG. 2 the raised position of the electromagnet is shown. For raising the electromagnet a curved link 30 is provided. This link is pivoted at its lower end by the aid of a pin 31 to core 20 which has an arcuate slot 32 therein for the accommodation of the lower end of link 30.

The upper end of the link 30 is pivoted as by a pin 33 (see also FIG. 3) to a crank or collar 34 which has a central slot 35 for the accommodation of the link 30. The collar 34 is mounted eccentrically on an axis 36 of a hexagonal shaft 37. This hexagonal shaft 37 has a cylindrical journal end 38 rotatably received in a boss 39 formed on the frame or casing 3. The collar 34 is prevented from axial movement by the aid of the spring rings 40.

As viewed in FIGS. 1 and 2, the collar 34 is eccentrically mounted with respect to the shaft axis 36 so as to provide a sufficient space for the entry of the link 30 into the slot 35. Furthermore, in the position of FIG. 2 in which the stem 1 is raised to its operative position, the shaft 37 is received in the bend of the link 30, thus providing an abutment or detent for limiting downward movement of the link. Furthermore, the line 36a joining the axis of the pivot 33 to the axis of pivot 31 passes to the right of axis 36. This corresponds to an over-center position. Spring 15, urging link 30 downwardly, is prevented from moving the link because of the contact between link 30 and abutment 37. Accordingly, the stem 1 may be maintained in its raised position of FIG. 2 until the shaft 37 be rotated back to the position of FIG. 1.

The shaft 37 at its other end is provided with a bearing sleeve 41 which has a hexagonal aperture for the reception of the shaft 37. Its exterior surface is cylindrical and provides a journal bearing in the boss 42 of the casing or housing 3. A spring ring 43 serves to maintain the sleeve 41 again inward movement.

For operating the shaft 37, use is made of a handle or lever 44 mounted in a collar 45 that is held to the end of the shaft 37 by the aid of a headless set screw 46. A washer 47 is interposed between the collar 45 and the exterior surface of the casing 3.

The casing 3 is provided with a cover member 48 which is appropriately fastened to the casing member 3. This cover member may be removed without disturbing any of the parts located within casing 3.

Opposite walls of the casing 3 are provided with ears 49 (FIGS. 3 and 4) for supporting an insulation panel 50 in vertical position in the casing. This insulation panel serves to support the transformer 29 and the rectifiers 98, indicated diagrammatically in FIGS. 4 and 7. Also indicated are terminal blocks 99 for facilitating connections for the electromagnet coil 23, transformer 29 and diode rectifiers 98. A sheet metal cover 51 (FIG. 1) is recessed in one of the walls of the casing 3, thus providing a space for the accommodation of conductors or cables extending into the casing 3, through apertures 52. These apertures may be threaded to accommodate appropriate insulation bushings.

Also mounted on the panel 50 is a control or snap switch mounted in a housing 53. This switch has a button 53a operated by the aid of a spring lever 54. This spring lever 54, in its unflexed position of FIG. 2, serves to operate the switch. Lever 54 is fastened at its upper end to the exterior of the housing 53. Its lower end is free to be flexed by a cam 55 (see FIGS. 1 and 4). This cam is active to flex lever 54 when the stem 1 is in its lower position.

Cam 55 is mounted on a hexagonal shaft 56 extending across a chamber 57 (FIG. 4). This chamber 57 is defined by a wall 58 formed integrally with the wall 11a. Chamber 57 serves to enclose an operator for shaft 56, as hereinafter described. Wall 58 also provides bearings for the bearing bushings 59 (FIG. 4). These bushings have hexagonal apertures to enable them to be mounted upon the hexagonal shaft 56. These bushings are held against axial movement by the aid of the spring rings 60.

The cam 55 is mounted externally of the wall 58 as by the aid of a set screw 61.

The cam 55 engages the right-hand side of the spring arm 54. When the spring arm is in the position of FIG. 2, the snap switch in housing 53 is in one of its positions.

and when the shaft 56 is rotated in a counterclockwise direction, in response to downward movement of stem 1, the switch in housing 53 assumes another of its operating positions, as indicated in FIG. 1.

To move the shaft 56 in this manner, use is made of a lever 62 located within the chamber 57. This lever has a bifurcated arm provided with hexagonal apertures forming an operative connection between the lever and the shaft 56. An arm 63 forming a part of the lever 62 is provided with a fork 64 embracing the stem 1 and engaged by the lower surface of the armature 10. Accordingly, when the armature 10 moves to the position of FIG. 1, the switch actuating spring arm 54 is moved to the position of FIG. 1.

At the left-hand end of the shaft 56 an indicator or pointer 65 is mounted, to show whether the valve is opened or closed. This pointer is held against movement in one direction by a spring ring 66. It is held in place against the spring ring 66 by the aid of a washer 67 extending over a threaded extension 68 of the shaft 56. A nut 69 serves to hold the indicator against removal.

The indicator 65, as shown most clearly in FIG. 5, is in the form of a pointer cooperating with an index plate 70. This index plate (FIG. 3) is mounted on the wall 11a. A coil spring 71 is anchored at one end to the shaft 56 and the other end engages the bottom surface of the frame 3. This spring urges the lever 62 in a clockwise direction so that the fork 64 is continuously urged resiliently against the lower surface of armature 10.

A transparent window 72 (FIG. 4) is mounted over an opening 73 in the frame member 3 to expose the indicator arm 65 for exterior viewing. A similar window 74 is mounted on the right-hand side of the casing 3.

When the mechanism is in the position of FIG. 1, the leads 28 for the coil 23 extend downwardly within the wall 11a. As the handle 44 is moved in a clockwise direction to the position of FIG. 2, these leads flex upwardly over the upper edge of wall 11a to assume the position of FIG. 2. Due to the relative positions of transformers 29, coil 23 and of the other elements mounted on panel 50, the flexing of the leads is such as to preclude any sudden or sharp bends.

As shown in FIG. 1, the cover member 4 is mounted over the top opening of the valve casing or body 5. An inlet opening 75 for the body is defined by an insert member 76 mounted in the cylindrical surface 77 of the valve body 5. This opening tapers inwardly. The insert has a flange 79. This insert is held between the flange 78 of a conduit, engaging the flange 79.

The flange 78 is attached as by the aid of cap screws 80 to the flange 81 of the body 5. A gasket 82 may be interposed between the two flanges.

A similar insert 83 is provided in the left-hand or outlet passage 84 of the valve body 5. This insert has an inner threaded flange 85 cooperating with the internal threads 86 of the opening 84. The opening 87 formed in the insert is directly opposite the opening 75, thereby forming a linear flow from the inlet opening 75 to the outlet opening 87. Furthermore, the opening 87 is tapered inwardly.

Cooperating with the rounded inner edge 88 of the insert 83 is a closure member 89. This closure member may be of disk-like form made of yielding material, such as rubber, felt, or the like. It is backed by a backing plate 90. A cover disk 91 is threaded on a sleeve 92 which extends through the members 89 and 90 for holding the closure member 89 against the backing plate 90.

The sleeve 92 has a spherical concave surface 93 cooperating with the inner spherical end of a mounting post 94, permitting universal movement between the closure structure and the mounting post 94 so that it may accurately seat upon the edge 88. The sleeve 92 telescopes over the post 94, and a spring 92a yieldingly urges the spherical surfaces of the sleeve and the post together.

The mounting post serves to attach the closure structure to the end of a lever arm 95. This lever arm 95 is mounted on a pivot 96 transverse to the valve body 5 and located above the valve opening. A link 97 serves as a coupling between the stem 1 and the lever 95.

By the use of the inserts 76 and 83, the opening of the valve is reduced sufficiently so as to make possible the use of a relatively small diameter closure member 89. Due to the venturi effect of the inserts 76 and 83, the rate of flow is nevertheless maintained substantially as much as if the inserts were omitted. Correspondingly, a smaller lever 95 may be used for moving the closure member 90 to the dotted-line position indicated in FIG. 1 when the stem 1 is moved upwardly. In the open position of FIG. 1, the venturi-like passageway accomplishes the rapid flow of fluid in a linear stream. The closure structure finds ample room between the inserts to move from closed to open position. In the latter position, shown in phantom lines in FIG. 1, the closure structure assists in defining a linear flow between the inserts 76 and 83.

The space 57 is quite adequately sealed by the bushings 59 (FIG. 4) passing through wall 58. This sealing is sufficient to provide a damping action for the movement of armature 10 in surface 11. This armature has a material clearance in this surface, and the provision of a Teflon ring 12 ensures against sticking of the armature 10 in the cylinder space. The closed space 57 acts as a dashpot. This damping effect prevents too rapid motion of the armature 10 when coil 23 is deenergized. The large distance traveled by the closure structure, the strength of spring 15, and the inertia of the rapidly moving parts would contribute to disastrous pounding of the valve closure against the seat 88, thus shortening the useful life of the valve. But by the provision of the dashpot effect, this harmful pounding is avoided.

The mode of operation is apparent from the foregoing. In the valve closing position of FIG. 1, the electromagnet coil 23 is deenergized. In order to open the valve to the phantom-line position, it is not only necessary to move the handle 44 in a clockwise direction, but for the electromagnet coil 23 to be energized. When this energization exists, clockwise movement of the handle 44 causes the armature 10 to move upwardly, following the movement of the magnet core 20. Ultimately the stem 1 rises to the position of FIG. 2 where the curved link 30 cooperates with the shaft 37 to lock the stem 1 in this position until it is desired to close the valve. When this is to be accomplished, the handle 44 is simply moved back to the position of FIG. 1.

While the valve is open, in the dotted-line position of FIG. 1, this open condition can be maintained only while the electromagnet coil 23 is energized. Just as soon as a condition exists which causes deenergization of the magnet 23, the spring 15 moves the armature 10 downwardly to the position of FIG. 1, and the valve closes.

Due to the dash-pot effect of the motion of armature 10 in the cylinder surface 11, the closing is effected without harmful pounding of the closure member 89 on its seat 88.

The inventor claims:
1. In an operator:
a movable member;
a crank for the member;
means mounting the crank for movement about an axis;
a link pivotally connected at its ends respectively to the crank and the member;
means defining a path of movement for the member;
a line joining the link pivots passing from one side of said axis through a neutral central position to the other side of said crank axis as the crank is moved in one angular direction;
and stop means engaging the crank, limiting movement of the crank in one angular direction to determine a limited position in which said line is just beyond said central position;
said member being advanced by movement of the crank in the other angular direction away from said stop means and being retracted by movement of the crank in said one angular direction toward said stop means;

a force acting upon the member in a direction to advance the member being opposed by said stop means when said crank is adjacent its said limited position.

2. In an operator:

a movable member;

a crank for the member;

means mounting the crank for movement about an axis;

a link pivotally connected at its ends respectively to the crank and the member;

means defining a path of movement for the member;

a line joining the link pivots passing from one side of said axis through a neutral central position to the other side of said crank axis as the crank is moved in one angular direction;

stop means engaging the crank, limiting movement of the crank in one angular direction to determine a limited position in which said line is just beyond said central position;

said member being advanced by movement of the crank in the other angular direction away from said stop means and being retracted by movement of the crank in said one angular direction toward said stop means;

and means resiliently urging the member to advance along its path, said urging means opposing movement of the crank away from its limited position.

3. In an electromagnetic operator:

an electromagnetic member;

an armature member adapted to be attached to the electromagnetic member so as to be moved in unison upon movement of either of the members;

means defining a path of movement for said members;

an operating lever having an axis; said lever serving as a handle for manual operation;

a link directly and pivotally connected at its ends respectively to the lever and to one of the members;

a line joining the link pivots passing from one side of the lever axis through a neutral central position to the other side of said lever axis as the lever is moved in one angular direction;

and stop means limiting movement of the lever in one angular direction to determine a limited position in which said line is just beyond said central position;

said one member being advanced by movement of the lever in the other angular direction away from said stop means and being retracted by movement of the lever in said one angular direction toward said stop means;

a force acting upon said one of said members in a direction to advance the said one member being opposed by said stop means when said lever is adjacent its said limited position.

4. In an electromagnetic operator:

an electromagnetic member;

an armature member adapted to be attached to the electromagnetic member so as to be moved in unison upon movement of either of the members;

means defining a path of movement for said members;

an operating lever having an axis; said lever serving as a handle for manual operation;

a link directly and pivotally connected at its ends respectively to the lever and to one of the members;

a line joining the link pivots passing from one side of the lever axis through a neutral central position to the other side of said lever axis as the lever is moved in one angular direction;

stop means limiting movement of the lever in one angular direction to determine a limited position in which said line is just beyond said central position;

said one member being advanced by movement of the lever in the other angular direction away from said stop means and being retracted by movement of the lever in said one angular direction toward said stop means;

and means resiliently urging the other of the members to advance along its path; said urging means opposing movement of the lever away from its said limited position when said members are attached to each other.

5. In an operator:

a movable member;

a crank for the member;

means mounting the crank for movement about an axis;

a link pivotally connected at its ends respectively to the crank and the member;

means defining a path of movement for the member;

a line joining the link pivots passing from one side of said axis through a neutral central position to the other side of said crank axis as the crank is moved in one angular direction;

said link and said crank having opposed parts engaging each other when said crank is moved angularly in one direction from said neutral central position to determine a limited position of said crank, said member being advanced by movement of the crank in the other angular direction away from said central neutral position and being retracted by movement of the crank in said one angular direction;

and means resiliently urging the member to advance along its path, said urging means opposing movement of the crank away from its limited position.

6. The combination as set forth in claim 5, in which the movable member includes an electromagnet part and an armature part separable from each other, one of the parts being pivotally connected to the link, and the resilient urging means acting upon the other of said parts where deenergization of the electromagnet permits the other of said parts to be advanced.

References Cited by the Examiner

UNITED STATES PATENTS

| | | | |
|---|---|---|---|
| 1,161,460 | 11/1915 | Doble | 251—124 |
| 1,243,219 | 10/1917 | Ralphs | 137—554 |
| 1,293,697 | 2/1919 | Canfield | 317—178 |
| 2,088,174 | 7/1937 | Paullin | 317—178 |
| 2,268,960 | 1/1942 | Ray | 137—66 |
| 2,271,506 | 1/1942 | Mantz | 158—131 |
| 2,275,340 | 3/1942 | Betz | 317—175 X |
| 2,414,751 | 1/1947 | Ludeman | 251—124 |
| 2,537,450 | 1/1951 | Ewing | 137—66 |

ISADOR WEIL, *Primary Examiner.*

R. GERARD, *Assistant Examiner.*